United States Patent [19]

Greene et al.

[11] Patent Number: 4,744,269
[45] Date of Patent: May 17, 1988

[54] AUTOMATIC TRANSMISSION WITH LOCKUP CONVERTER CLUTCH CONTROLS

[75] Inventors: Thomas L. Greene, Plymouth; Bruce J. Palansky, Livonia, both of Mich.

[73] Assignee: Ford Motor Company, Dearborn, Mich.

[21] Appl. No.: 927,624

[22] Filed: Nov. 6, 1986

[51] Int. Cl.$^4$ ............................................. B60K 41/22
[52] U.S. Cl. ........................................ 74/868; 74/864; 192/3.3
[58] Field of Search ...................... 192/3.3, 3.31, 3.58; 74/866, 867, 868, 869, 864

[56] References Cited

U.S. PATENT DOCUMENTS

| | | | |
|---|---|---|---|
| 4,432,255 | 2/1984 | Borman et al. | 74/868 X |
| 4,457,410 | 7/1984 | Suga et al. | 192/3.31 X |
| 4,478,322 | 10/1984 | Carlson et al. | 192/3.31 X |
| 4,495,576 | 1/1985 | Ito | 74/867 X |
| 4,559,850 | 12/1985 | Sakakibara | 74/868 |
| 4,589,537 | 5/1986 | Nishikawa et al. | 192/3.31 X |
| 4,595,088 | 6/1986 | Sugano | 192/3.31 X |
| 4,638,690 | 1/1987 | Hattori et al. | 74/866 |

FOREIGN PATENT DOCUMENTS

| | | | |
|---|---|---|---|
| 0037050 | 10/1981 | European Pat. Off. | 74/869 |
| 0116898 | 8/1984 | European Pat. Off. | 74/868 |
| 0184763 | 9/1985 | Japan | 192/3.3 |
| 2067688 | 7/1981 | United Kingdom | 74/869 |

Primary Examiner—Lawrence Staab
Assistant Examiner—Dwight G. Diehl
Attorney, Agent, or Firm—Donald J. Harrington; Keith L. Zerschling

[57] ABSTRACT

A hybrid hydraulic and electronic control valve system for an automatic, multiple-speed motor vehicle transmission having a torque converter with a lockup clutch and change-speed gearing adapted for four forward ratios and one reverse ratio, a converter lockup clutch control valve in conjunction with a lockup clutch shift valve adapted to control the lockup clutch and an electronic control module for superseding the action of the lockup clutch shift valve.

4 Claims, 14 Drawing Sheets

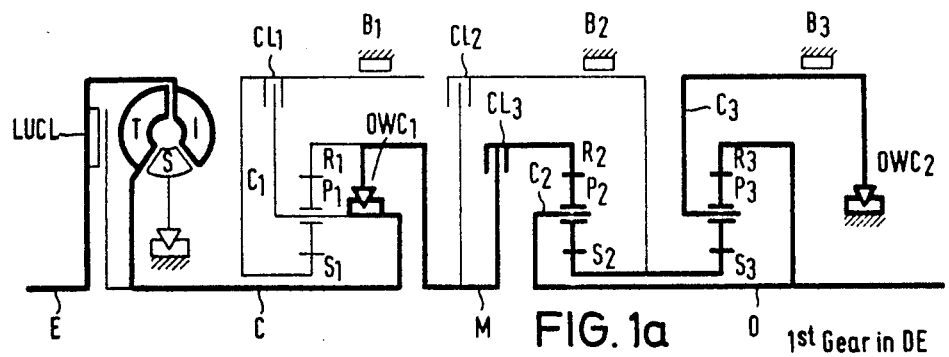
FIG. 1a  1st Gear in DE
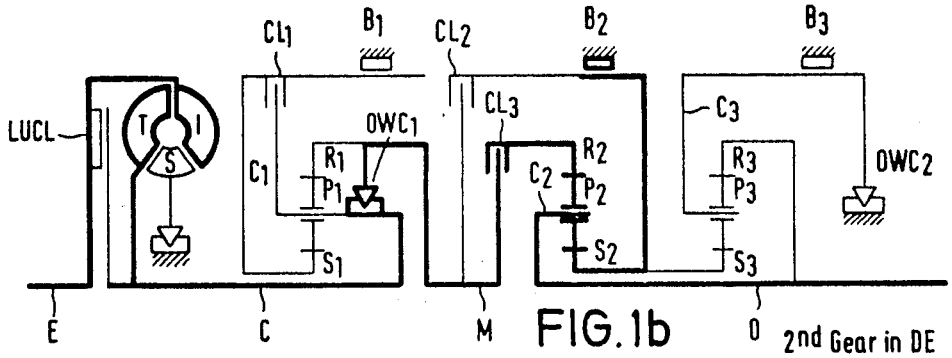
FIG. 1b  2nd Gear in DE
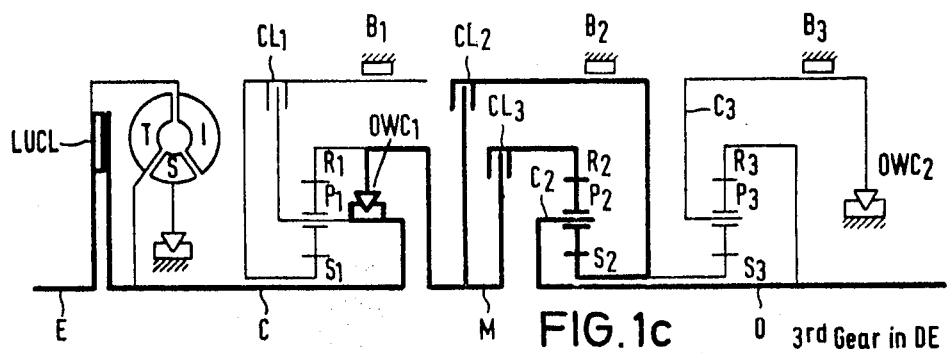
FIG. 1c  3rd Gear in DE
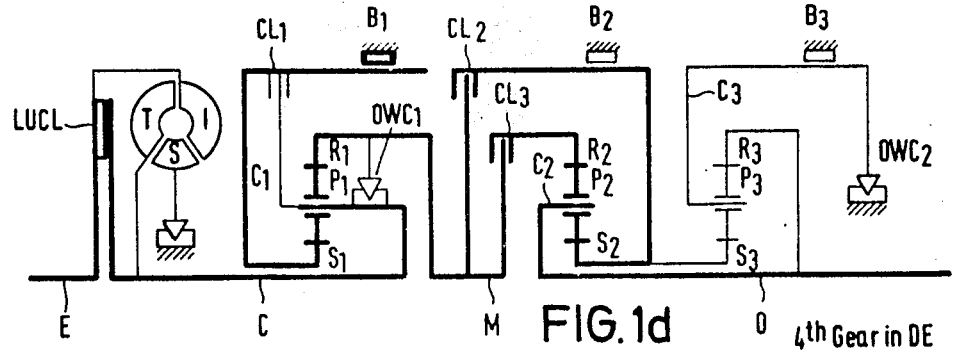
FIG. 1d  4th Gear in DE

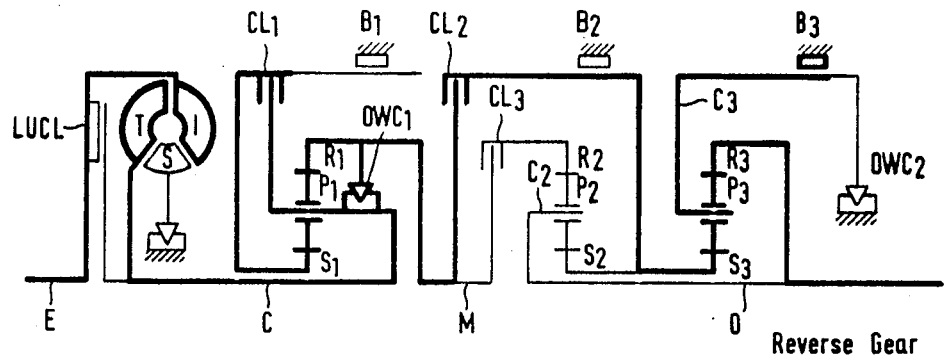
FIG. 1e — Reverse Gear
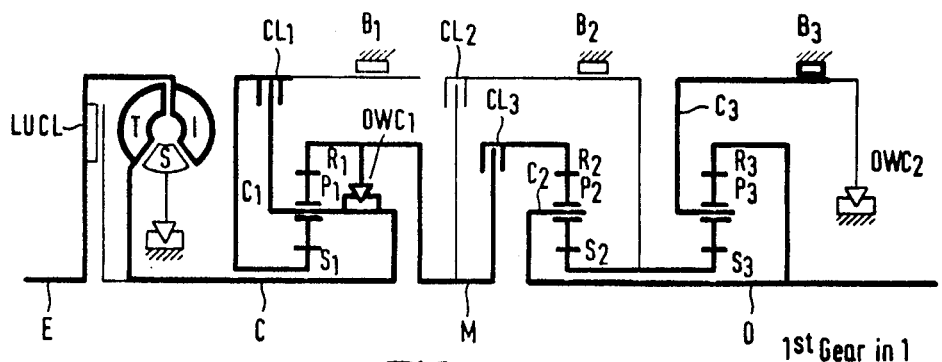
FIG. 1f — 1st Gear in 1
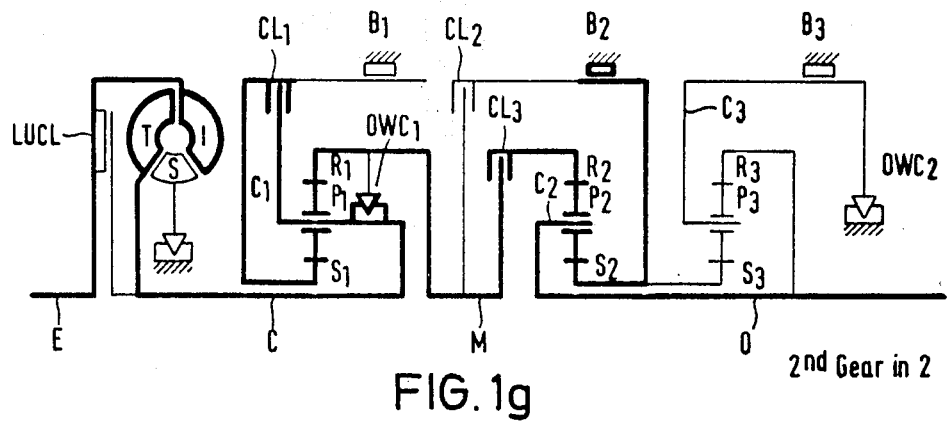
FIG. 1g — 2nd Gear in 2

| MANUAL VALVE POSITIONS | | | FRICTION AND REACTION-ELEMENTS APPLIED | | | | | | | | |
|---|---|---|---|---|---|---|---|---|---|---|---|
| | | | LUCL | CL₁ | B₁ | OWC₁ | CL₂ | CL₃ | B₂ | B₃ | OWC₂ |
| P | PARK | | | | | | | | | | |
| R | REVERSE (FIG. 1e) | | | ■ | | ■ | | | | ■ | |
| N | NEUTRAL | | | | | | | | | | |
| DE | DRIVE ECONOMY (FIG. 1a) | 1 | | | | | ■ | ■ | | | ■ |
| DE | DRIVE ECONOMY (1b) | 2 | | | | | ■ | ■ | ■ | | |
| DE | DRIVE ECONOMY (1c) | 3 | ■ | | | | ■ | ■ | | | |
| DE | DRIVE ECONOMY (1d) | 4 | ■ | | ■ | | ■ | | | | |
| D | (1a) | 1 | | | | | ■ | ■ | | | ■ |
| D | (1b) | 2 | | | | | ■ | ■ | ■ | | |
| D | (1c) | 3 | ■ | | | | ■ | ■ | | | |
| 2 | 2ND GEAR (1g) | | | ■ | | ■ | | ■ | ■ | | |
| 1 | 1ST GEAR (1f) | | | ■ | | ■ | | ■ | | ■ | |

FIG. 2

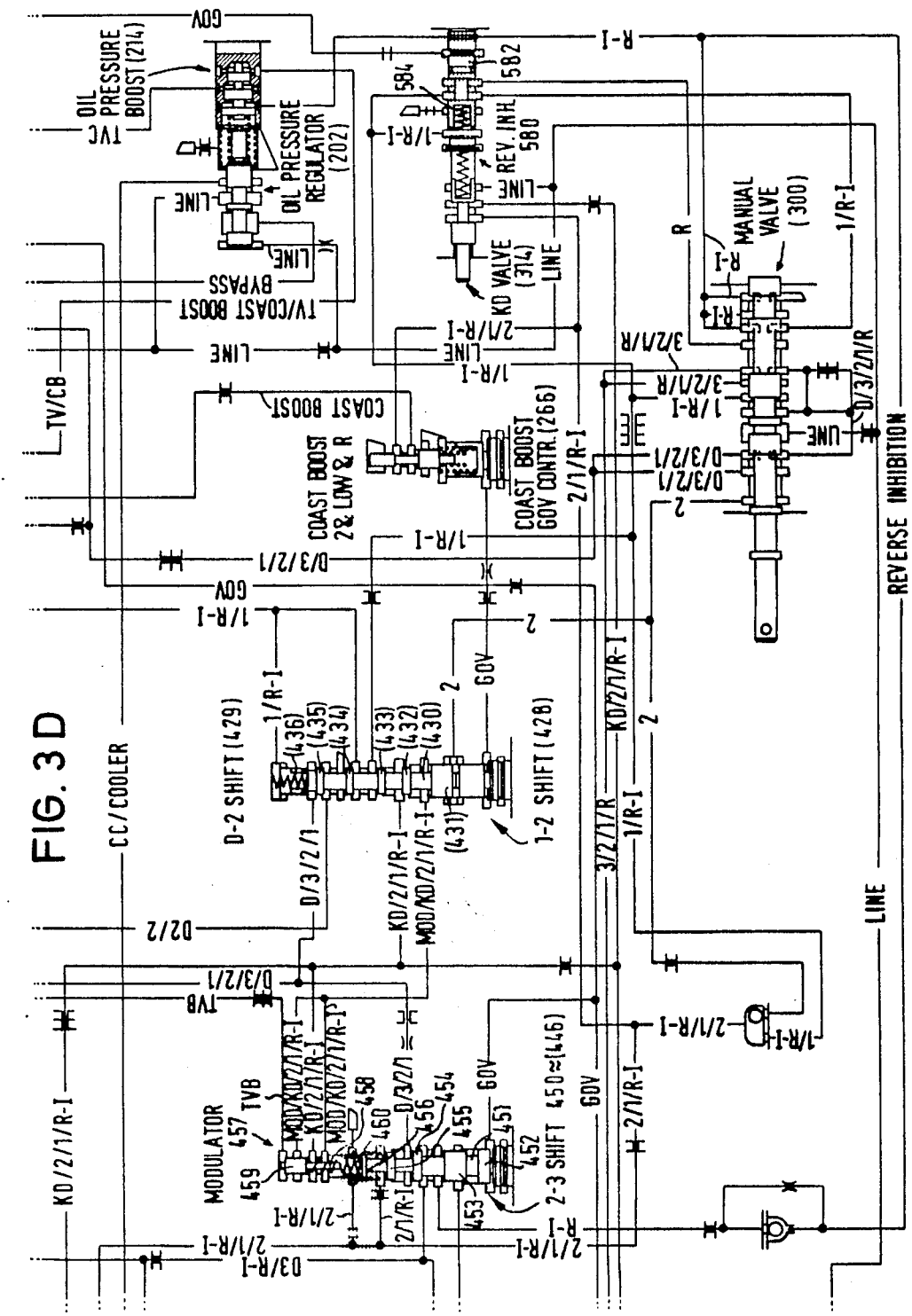

0 = RESTPOSITION   1 = SHIFTPOSITION

| COAST CONTROL VALVE (276) | TORQUE DEMAND SHIFTVALVE (278) | CALIBRATED SHIFTS IN: |
|---|---|---|
| 0 | 1 | 3-2 MAN. COASTING |
| 0 | 0 | 3-2 COASTING |
| 1 | 1 | 3-2 KICK-DOWN SHIFT |
| 1 | 0 | 3-2 TORQUE DEMAND SHIFT |

0 = RESTPOSITION
1 = SHIFTPOSITION
X = POSITION OF NO CONCERN FOR FUNCTION

| COMFORT CONTROL VALVES | | | | | CALIBRATED SHIFTS IN: |
|---|---|---|---|---|---|
| 3-2 LTV CONTROL VALVE 600 | 3-2 TD CONTROL VALVE 620 | 3-2 KD TIMING VALVE 640 | 3-2 ISR KD CONTROL VALVE 660 | 3-2 HC KD CONTROL VALVE 680 | |
| 0 | 0 | X | X | X | 3-2 MAN. COASTING |
| 0 | 1 | 1 | 1 | X | 3-2 MAN. COASTING |
| 0 | 1 | 1 | 0 | X | 3-2 MAN. COASTING |
| 1 | 0 | X | X | X | 3-2 TORQUE DEMAND 1.SECTION |
| 1 | 1 | X | X | X | 3-2 TORQUE DEMAND 2.SECTION |
| 1 | 1 | 1 | 0 | 0 | 3-2 KICK-DOWN 1.SECTION |
| 1 | 1 | 1 | 1 | 0 | 3-2 KICK-DOWN 2.SECTION |
| 1 | 1 | 1 | 1 | 1 | 3-2 KICK-DOWN 3.SECTION |

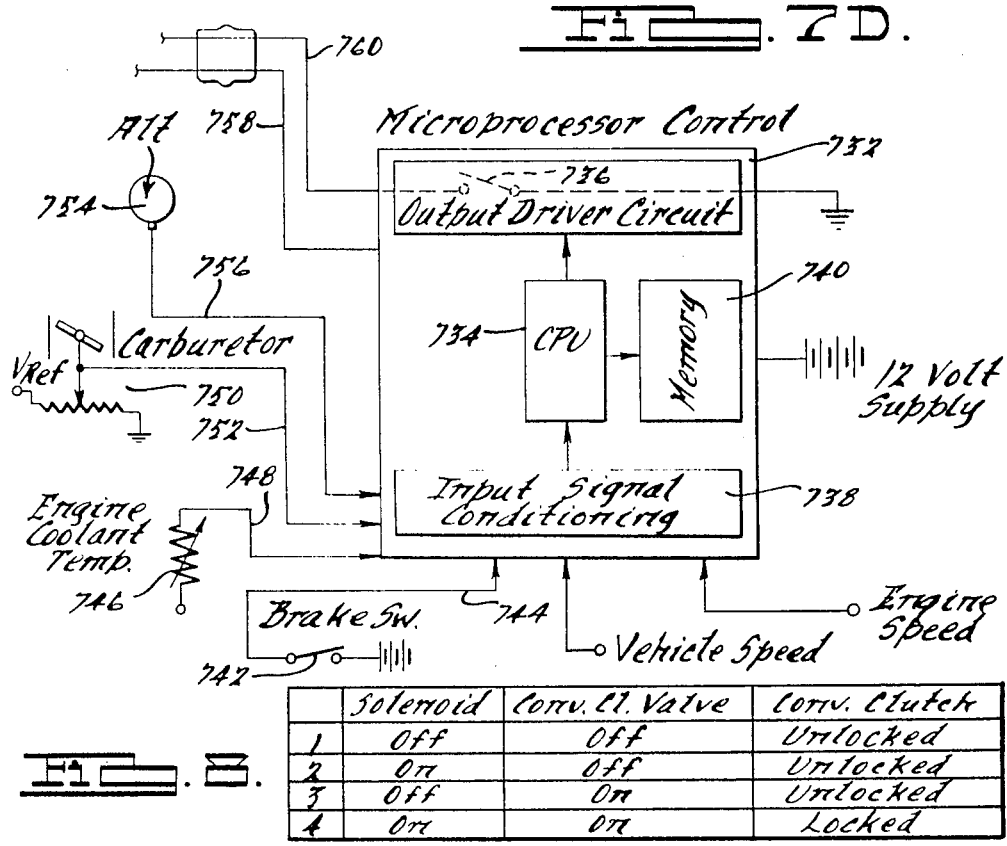
FIG. 7D.
| | Solenoid | Conv. Cl. Valve | Conv. Clutch |
|---|---|---|---|
| 1 | Off | Off | Unlocked |
| 2 | On | Off | Unlocked |
| 3 | Off | On | Unlocked |
| 4 | On | On | Locked |
FIG. 8.
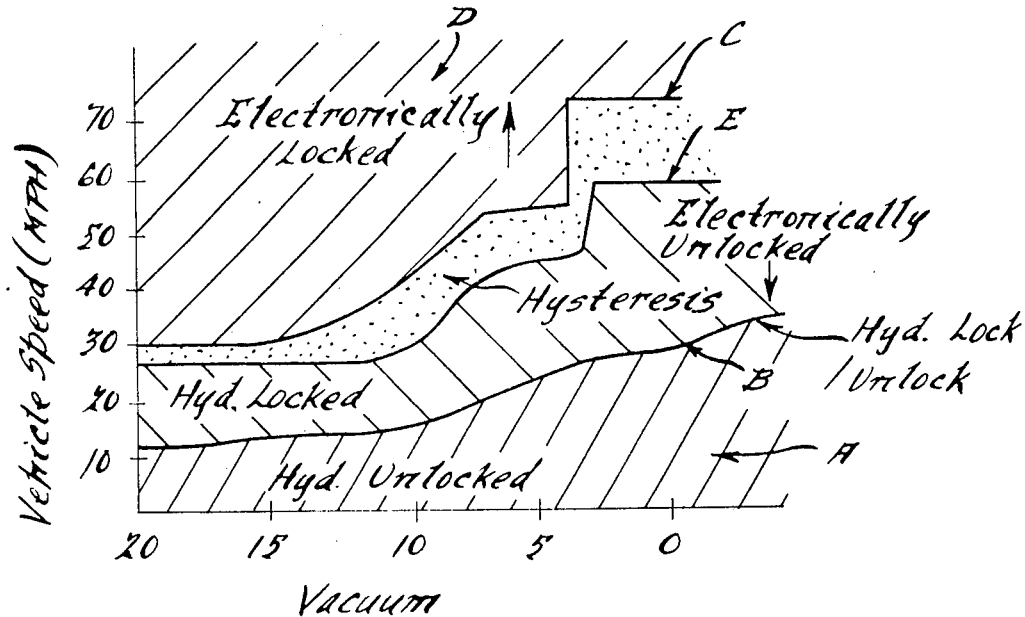
FIG. 8A.

AUTOMATIC TRANSMISSION WITH LOCKUP CONVERTER CLUTCH CONTROLS

REFERENCE TO RELATED PATENT APPLICATIONS

This application relates to U.S. Ser. No. 732,026, filed May 8, 1985, now U.S. Pat. No. 4,649,763, filed by Kurt Graef et al, entitled "MULTIPLE-SPEED, HYDROKINETIC TRANSMISSION" and to U.S. Ser. No. 733,276, filed May 10, 1985, entitled "HYDRAULIC CONTROL VALVE SYSTEM FOR A MULTIPLE-SPEED AUTOMATICALLY SHIFTING, HYDROKINETIC-MECHANICAL CHANGE-SPEED GEARBOX FOR MOTOR VEHICLES", now abandoned, filed by Schulz et al. Both of these applications are assigned to the assignee of this invention.

GENERAL DESCRIPTION OF THE INVENTION

The invention relates to an hydraulic control valve system for a multiple-speed, automatically shifting, hydrokinetic mechanical, change-speed gearbox for motor vehicles.

An hydraulic control valve system for a multiple-speed, automatically shifting, hydrokinetic-mechanical, change-speed transmission for motor vehicles is disclosed in U.S. Pat. No. 3,706,240, which is assigned to the assignee of this application. That patent describes elements of planetary, change-speed gearing comprising a gearset added upstream of a Simpson-type system. Ratio changes are effected by means of piston servo mechanisms. The servo mechanisms respond to movement of a manual selection valve which communicates with a main pressure regulating valve. The line pressure is controlled by a pressure regulating valve as it responds to signals indicating the torque requirement and the velocity of travel. Special valve structure is provided to effect particular operating ranges in order, for example, to control various shifting functions for a 4-3 downshift irrespective of whether the vehicle is operating in a cruising mode or is in an acceleration mode.

The present specification describes an hydraulic control valve system of the type described above for a multiple-speed, automatically shifting, hydrokinetic-mechanical, change-speed gearbox for motor vehicles having a converter lockup clutch and wherein the fourth forward gear is an overdrive.

The hydraulic control system described includes a converter lockup clutch control for the third and fourth gears and also control logic for the fourth gear to effect an overdrive, a 3-4 upshift control, a control for preventing fourth gear operation during kick-down, and a speed-dependent control for preventing engagement of the second and first gears and the reverse gear in the event of erroneous operation of the selector lever.

Control functions of the hydraulic control valve system achieve an improvement in the quality of the 3-2 downshift and a coast drive upshift by controlling the clutch and brake engagement characteristics to provide smooth ratio changes.

According to a principle feature of the present invention, the converter lockup clutch is controlled by a converter clutch shuttle valve that responds to a lockup clutch shift signal distributed to it by a converter clutch shift valve. The converter clutch shift valve, in turn, is controlled by a transmission governor pressure, which measures vehicle speed, and by throttle valve pressure, which is a function of engine intake manifold pressure.

In addition to hydraulic operation of the converter clutch shuttle valve, we have provided solenoid valve which, as will be explained, supersedes the operation of the hydraulic circuit for actuating the converter clutch lockup valve. The solenoid valve is under the influence of a control module in the form of a microprocessor which, among other functions, controls engine spark advance, engine EGR valve operation (exhaust gas recirculation). The microprocessor achieves a converter clutch control strategy under certain operating conditions where the vehicle speed is higher than a selected calibrated value.

The operation of the converter clutch lockup valve thus is determined by a hybrid control which uses transmission hydraulic control strategy as well as electronic control strategy, the latter overruling the former at speeds greater than a calibrated minimum value. If, for some reason, the electronics should be ineffective or not available because of a disabling transient condition, the hydraulics would control the operation of the converter lockup clutch valve. In this respect, the control may be described as a hybrid.

Electronic lock-up clutch control are described in U.S. Pat. Nos. 4,503,956; 4,457,411; 4,457,410; 4,523,281; 4,577,737 and 4,476,470. The teachings of these patents are incorporated by reference in this application.

DESCRIPTION OF THE DRAWINGS

The invention is explained in greater detail with reference to the embodiment illustrated in the accompanying drawings, in which:

FIGS. 1a through 1g show diagrammatic views of the multiple-speed, hydrokinetic-mechanical transmission with overdrive. The transmission elements that are effective in the various gears being emphasized by heavy lines.

FIG. 2 is a table showing the clutches and brakes that are engaged or applied in the operating ranges selected by the manual selector valve.

FIGS. 3a through 3d show the hydraulic control valve system with a plurality of shift and control valves including those disclosed in U.S. Pat. No. 3,706,240. The additional control valves or the modified control valves of the present invention are emphasized by a grid-pattern shading, and the lines connecting the individual valves are provided with inserted letters and numerals that indicate the pressure the respective line is supplying and the operating state appropriate for that pressure. The valves that are common to U.S. Pat. No. 3,706,240 are designated by reference numerals in parentheses that are used in that specification.

FIG. 5 is a table showing the shifting logic disclosed in U.S. Pat. No. 3,706,240.

FIG. 6 is a table of the extended shifting logic according to the present invention.

FIG. 7d is a schematic view of a microprocessor circuit, which forms a part of the valve system of FIG. 7a through 7c.

FIG. 8 is a performance chart showing control strategy for the lockup clutch.

FIG. 8a is a graph illustrating the electronically operated control strategy for the operation of the converter clutch shuttle valve at vehicle speeds greater than a minimum calibrated vehicle valve.

PARTICULAR DESCRIPTION OF THE INVENTION

Figure 3A:
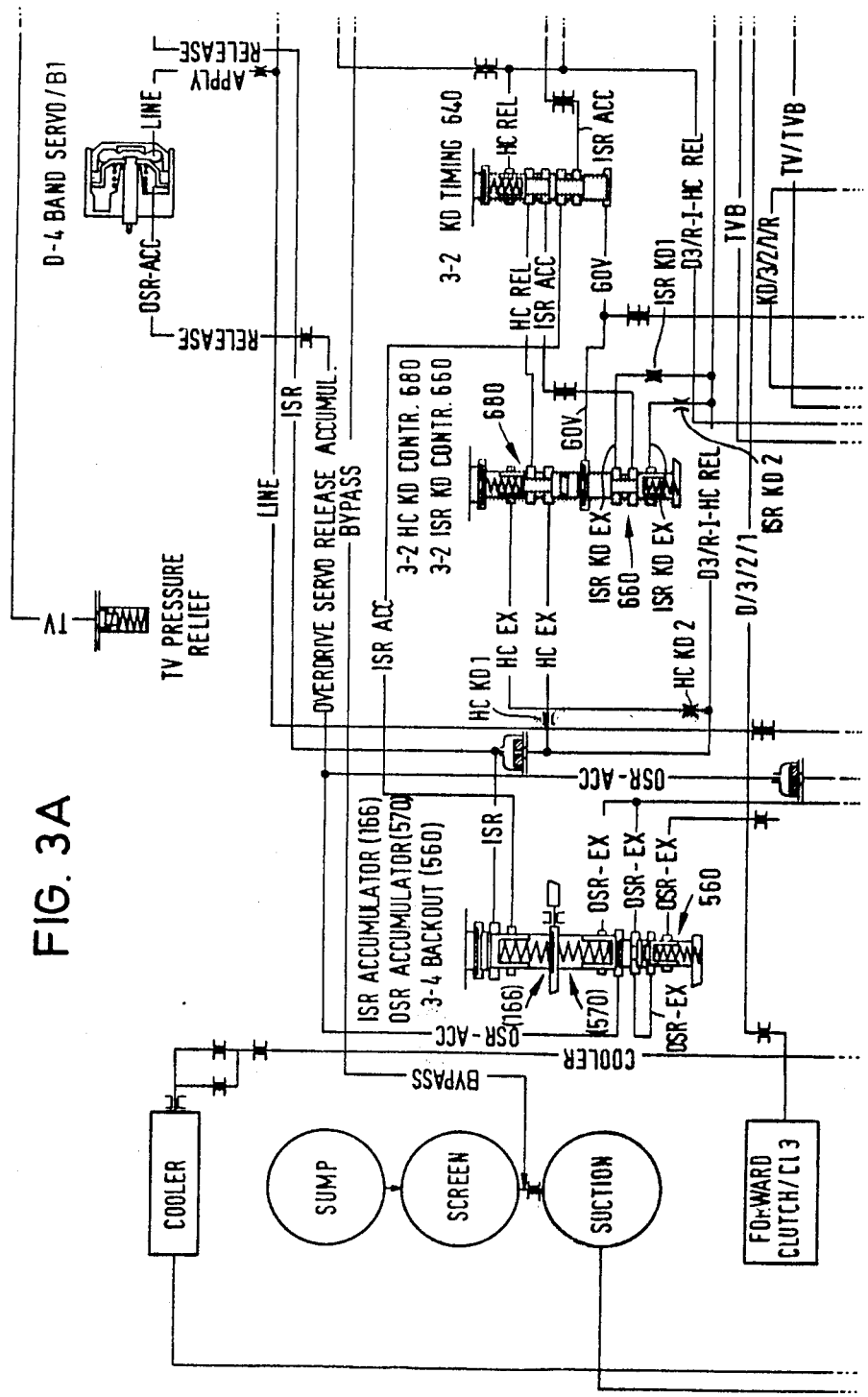
Figure 3B:
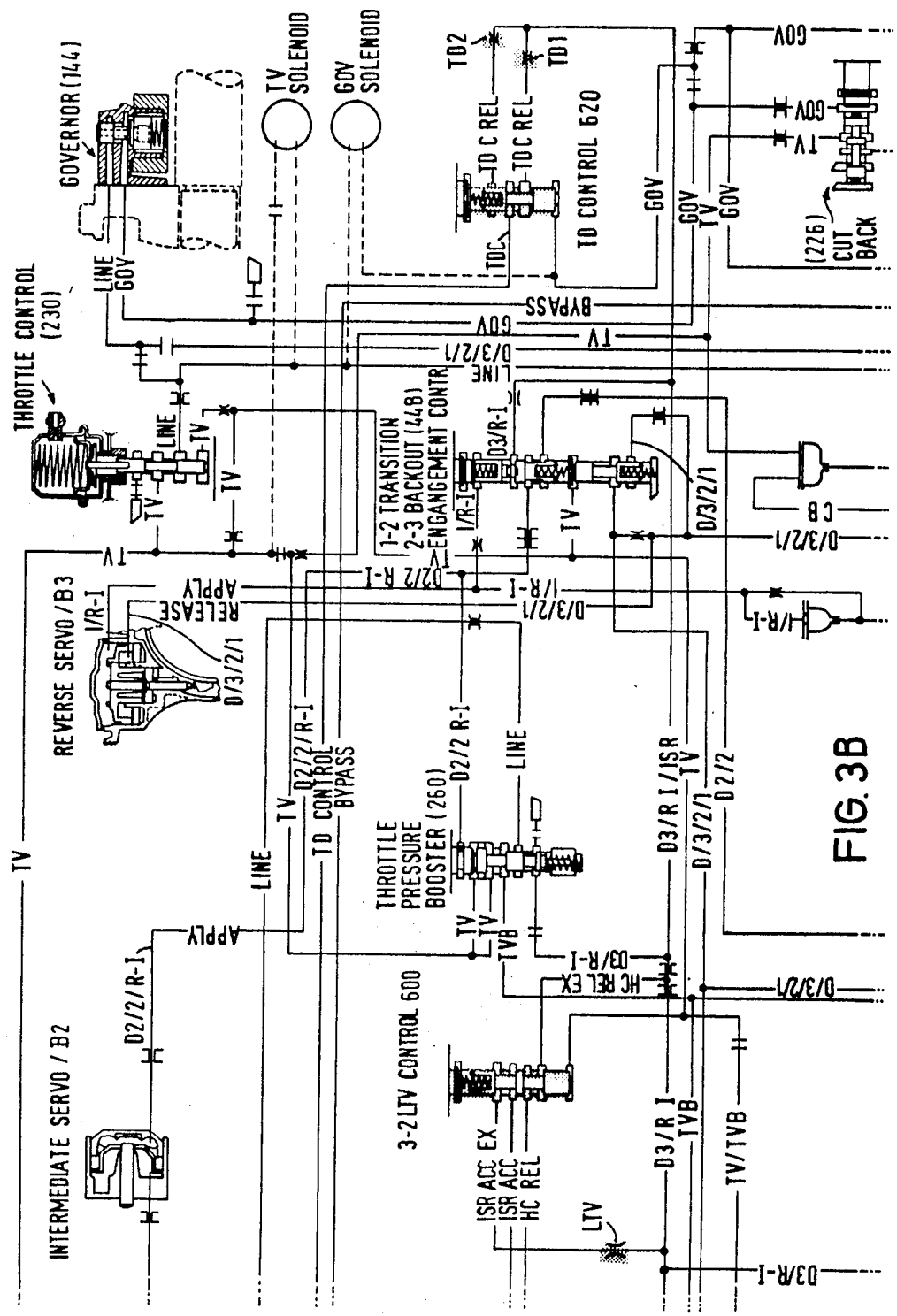

Reference is made first of all to FIGS. 1a–1g, which show the transmission design and the clutches and brakes actuated in the various gear stages. FIG. 2 shows the clutch and brake engagement and release pattern for the clutches and brakes.

As shown in FIGS. 1a–1g, the transmission arrangement comprises an engine crankshaft E, which is connected in a driving manner to the impeller member I of a hydrokinetic torque converter. The turbine member T, which is driven by the impeller member I with the interposition of stator member S, drives the planet carrier C1 of a set added upstream by means of a converter turbide shaft or input shaft C.

In addition, a converter lockup clutch LUCL, which can be engaged selectively, is provided in the impeller housing of the torque converter.

The gear unit added upstream comprises a sun gear S1, planet pinions P1 and ring gear R1. The sun gear S1 is connected to a brake drum, which is surrounded by a brake band B1 and which at the same time forms part of a clutch CL1. The ring gear R1 forms the drive of the initially shifted set and is connected in a driving manner to a central shaft M.

The driving torque imparted to the gear unit added upstream by means of the input shaft or converter shaft C can be transmitted upon engagement of the clutch CL1, which connects the sun wheel S1 to the planet carrier C1. Coasting torque can be transmitted through the gear unit from shaft M to shaft C. Torque can be transmitted in the driving direction in the first, second and third ratios by locking an overrunning clutch OWC1 disposed between the planet carrier C1 and the central shaft M.

The central shaft M forms the input member for a known Simpson-type gear system which comprises two input clutches. Input clutch CL2 can drive the sun wheels S2 and S3 connected to one another and input clutch CL3 can drive the ring gear R2. The planet carrier C2 and the ring gear R3 are connected drivably to the output shaft O of the transmission.

A third brake B3 is provided to fix the planet carrier C3 against rotation during coasting and reverse drive. A second overrunning clutch or brake OWC2 is provided, in order to fix the planet carrier C3 against rotation in a driving direction.

FIG. 2 is a chart showing the engagement and release pattern of the clutches and brakes selected by the setting of the manual selection valve.

In the shifting position "P", corresponding to "Parking", there is no clutch or brake function. In this position the engine speed is conveyed to the planet carrier C1 by way of the converter and the input shaft C. The inner race of the overrunning clutch OWC1 pressed on the planet carrier C1 conveys the torque to the outer race and the central shaft M by means of the overrunning clutch elements which lock in the direction of rotation of the engine. The central shaft M in turn drives the forward clutch member. The power flow ends here because both the forward clutch CL3 and the reverse and direct gear clutch CL2 are released. In addition, the output shaft O is locked by a parking mechanism which engages at vehicle speeds under approximately 6 km/h.

In the shifting position "R" corresponding to reverse, the clutch CL1 is engaged and the overrunning clutch OWC1 is locked, while the clutch CL2 and the brake B3 are actuated. The torque flow path in the forward region as far as the forward clutch member is similar to that of the shifting position "P". The connected sun wheels S2 and S3 are driven by means of the reverse gear, direct gear clutch CL2 and the drive shell connected to the clutch housing. Since the rear drum and thus the planet carrier C3 of the third planetary gear set are held by the reverse gear brake band B3 which is applied, the ring gear R2 and the output shaft O rotate in the opposite direction with the reverse gear ratio of 2.11:1.

In the shifting position "N", corresponding to neutral, there is no clutch or brake function. The torque flow path in the shifting position "N" is the same as in "P", i.e., there is no output drive. The output shaft, however, is not locked.

In the shifting position "DE", the automatic range, the transmission changes ratio automatically between the gear ratios 1 to 4 in accordance with the torque requirement and the velocity of travel. In the lower three forward drive ratios the forward gear unit is locked by the action of the overrunning clutch OWC1. In the Simpson-type system the clutch CL3 and the overrunning clutch OWC2 are actuated in the first ratio, the brake B2 and the clutch CL3 are actuated in the second ratio and the clutch CL2 and the clutch CL3 are actuated in the third ratio.

In addition, the converter lockup clutch LUCL may be engaged in the third gear. In the fourth gear the converter lockup clutch LUCL likewise may be engaged and the forward gear unit becomes effective on account of the applied brake B1; i.e., it is not locked but geared in an overdrive ratio (at present 0.75:1). The Simpson-type system remains in the same state as in the third gear; i.e., the two clutches CL2 and CL3 are engaged.

In detail, the torque flow in the individual gears is as follows:

DE—First Gear Acceleration

The power flow in the forward portion of the transmission forward clutch member is similar to that for position "P". The forward clutch CL3 is engaged under pressure, and the ring gear R2 of the second planetary gear set is driven in the direction of rotation of the engine. The planet pinions P2 are driven in the same direction by the ring gear R2. In this way the sun gear S2 is driven in the opposite direction. Sun wheel S2 drives the ring gear R3 by way of the planet pinions P3 of the third planetary gear set, and in this way the ring gear R3 is again turned in the direction of rotation of the engine. The rear planet carrier is connected to and is supported on the overrunning brake OWC2.

The combination of the planetary gear sets engaged in series produces an overall ratio of 2.474:1 for the first gear, the torque being transmitted to the output shaft O jointly from the planet carrier C2 of the second planetary gear set and from the ring gear R3 of the third planetary gear set.

DE—First Gear Coasting

In the coasting drive the rear overrunning clutch OWC2 freewheels so that there is no torque flow path to the converter. The engine speed then can drop to idling speed. The front overrunning clutch OWC1 would also free wheel if coasting torque were to be transmitted through the Simpson-type gearing, but this does not occur because of overrunning clutch OWC2.

DE—Second Gear Acceleration

The power flow in the forward portion of the transmission as far as the ring gear R2 of the second planetary gear set is similar to that for the first gear in shifting position "DE". In addition to the forward clutch CL3, the second brake B2 is applied by the application of pressure to the apply side of the servo of the second gear band, and in this way the drum of the reverse and direct gear clutch CL2 and the drive shell rigidly connected to the sun wheel S2 of the second planetary gear set are brake. The planet wheels P2 of the second planetary gear set mounted in the planet carrier are driven by the ring gear R2 and rotate with the planet carrier C2 about the sun gear S2 which is held, the planet carrier C2 rotating in a rigid connection with the output shaft in a gearing ratio of 1.47:1.

DE—Second Gear Coasting

During coasting the output shaft O drives the planet carrier C2 of the second planetary gear set, which is thereby rotated with its planet pinion P2 about the held sun gear S2 and drives the central shaft by way of the ring gear R2 and the forward clutch CL2. The power flow ends at the front first overrunning clutch OWC1, which freewheels in the coasting direction. In this way the engine speed can drop down to idling.

DE—Third Gear Acceleration

The power flow in the forward portion of the transmission as far as the ring gear R2 of the second planetary gear set is similar to that of the first gear in shifting position "DE". The change from the second to the third speed takes place upon the application of pressure to the release side of the servo of the second gear band. The second brake B2 then releases. Upon application of pressure to the reverse and direct gear servo the clutch CL2 engages. As a result, the sun gears S2 and S3 are driven by way of the drive shell. Since the annulus R2 and the sun wheel S2 are now driven at the speed of the input shaft by the second planetary gear set, the planet carrier C2 drives the output shaft O at the same speed.

In addition, after the 2-3 shift the torque converter clutch LUCL is also applied, so that the converter operates without slippage. In this way an actual 1:1 gear ratio is achieved in the third gear.

DE—Third Gear Coasting

As in the second gear, in position "DE" the front overrunning clutch OWC 1 freewheels and the engine can drop down to idling speed.

DE—Fourth Gear Acceleration

The power flow in the rear portion of the transmission from the central shaft M is the same as that for the third gear in position "DE". In addition, upon distribution of pressure to the application side of the servo of the first brake B1, the first brake B1 is actuated. As a result, the sun gear S1 is held fixed by way of the brake drum and its connection with the said sun gear S1. As already described above, the central shaft thereby rotates as an output in rigid connection with the ring gear R1 in the gearing ratio of 0.75:1.

DE—Fourth Gear Coasting Drive

In contrast to the first, second and third gears in the position "DE", the first overrunning clutch OWC 1 does not freewheel. The sun wheel S1 is also held firmly during coasting, and thus the planet carrier C1 is driven by the central shaft M. In this way the engine always rotates at the speed that corresponds to the velocity of the vehicle in conjunction with the driveline gearing. A so-called engine braking thus takes place.

In the shifting position "D", the automatic range, in which shifting takes place only between the gear stages 1 to 3, the clutches and brakes described above are again actuated. A desired freewheeling effect is produced during coasting by the overruning clutch OWC1 thus interrupting torque flow in the forward gear unit. The position "D" permits the maximum velocity of the vehicle to be achieved without KD actuation.

In the shifting position "2" the power flow and the gearing ratio during acceleration are the same as that described for position DE - second gear. In contrast to positions "DE" and "D", the vehicle starts directly in the second gear and does not upshift. This is advantageous when starting on soft, sandy or smooth ground and when coasting down an incline. The engine braking is effected by applying the first clutch CL1. When the shifting position "2" is selected at high vehicle speeds, the transmission changes into the second gear only when a reduced, moderate speed exists.

In the shifting position "1" the power flow and the gearing ratio during acceleration is the same as that described for position DE - first gear. In addition, the reverse gear drum is held by way of the rear brake band B3. Since the first clutch CL1 is also acted upon in this position, engine braking takes place. When the shifting position "1" is selected at high velocities, the transmission changes into the first gear only after a reduced speed is present. An upshift from the first gear does not take place. This shifting position is, therefore, particularly suitable for coasting down an incline with a heavy load or with a steep gradient.

Hydraulic Controls

FIGS. 3A through 3D show the valve arrangement of the hydraulic control valve system, which controls the application and release of the clutches and brakes of the change-speed gearbox of FIGS. 1a–1g in the sequence described in conjunction with FIG. 2. In FIGS. 3A through 3D the reference numerals that have been adopted for the valve have been used to designate corresponding valves disclosed in U.S. Pat. No. 3,706,240 mentioned in the introduction to this description and have been put in parentheses.

The manual selection valve, which can be moved manually into one of seven shifting positions designated by the symbols P, R, N, DE, D, 2 and 1, is provided with the reference number (300) in FIG. 3D.

The various pressure passages are pressurized with pressure in accordance with the selected shifting position. This is effected by control lands of the manual selection valve (300). The added letters and numeral combinations indicate in which shifting position the corresponding line supplying pressure or what pressure it is supplying. If the same line is supplying different pressures in different shifting positions or operating ranges, those pressures are indicated separately in each case by an oblique line.

Although in fact only three different pressures, the line pressure "LINE", the torque requirement or throttle pressure "TV" and the vehicle velocity or centrifugal governor pressure "GOV" are present in the hydraulic control valve system, each of these pressures is given a new name when it is effected by a corresponding valve or, on the other hand, changed or modulated.

The pressure fluid required for the operation of the hydraulic control valve system is supplied in known manner by a pump which produces the so-called system or line pressure LINE as soon as the internal combustion engine of the motor vehicle is running.

The level of the line pressure LINE is controlled by means of an oil-pressure regulator valve (202) shown in FIG. 3D and by means of an oil-pressure amplification valve (214) that functions in response to pressure signals that indicate the level of the torque requirement or the vehicle velocity, or in response to movement of the manual valve to the shifting position "R".

For this purpose the transmission is provided in known manner with a throttle pressure valve (230), which detects the torque requirement and which generates, by modulating the line pressure, a pressure signal, also called throttle pressure TV, which is proportional to the torque requirement and which is necessary for actuating various shift valves.

In addition, the transmission comprises in known manner a centrifugal governor valve (144), which detects the velocity of travel and which generates, by modulating the line pressure, a pressure signal, also called centrifugal governor pressure GOV, which is proportional to the vehicle velocity and which likewise acts upon the various shift valves in order to effect the automatic shifting procedures.

The hydraulic control valve system comprises in known manner a plurality of shift valves which, as a function of the effective line pressure LINE, of corresponding spring forces, of the throttle pressure TV and of the centrifugal governor pressure GOV, initiates the application and release of the corresponding clutches and brakes.

Thus a 1-2 shift valve (428), a 2-3 shift valve 450 (446) and a 3-4 shift valve 550 (334) are provided, which control the upshift procedures in known manner.

In addition, suitable 3-2 cushion control valves are provided for different drive ranges, i.e., for the coast drive (276) or for the torque drive (278) (see FIG. 5).

Furthermore, a coasting drive amplification valve (226) is provided to increase the line pressure in the coasting drive. Accumulator valves (166 and 570) are provided in order to control the pressure fluid displacement from the release side of the servo for B2 and B1 and to achieve thereby a suitably cushioned application of the brake bands.

In addition, a torque requirement valve or kick-down valve (314) is provided, upon actuation of the accelerator pedal in the kick-down speed range, causes a forced downshift back from the engaged gear into one of the lower gears or delays or prevents upshifting.

Since the effect of the throttle pressure TV at high vehicle speeds would still lead to a further increase in the line pressure LINE, a cutoff valve (226) is provided which is controlled by the vehicle velocity pressure GOV.

The new valve arrangements according to the invention and the valve arrangements modified according to the invention are now described below and are emphasized in the drawing by a grid-pattern shading.

The desired torque converter lockup clutch control during operation in the third and fourth gears is made possible by a torque-converter lockup clutch control valve 500 and a lockup clutch shift valve 520 cooperating therewith. The control valve 500 comprises a valve member 504 which is biased by a spring 502 and which essentially has three control lands 506, 508 and 510. These lands are disposed in such a way that in the position shown in FIG. 3C, in which the converter clutch LUCL is opened, the converter inflow pressure CC is fed to the converter by way of the line (CC/EX) upstream of the lockup clutch piston and reaches the converter torus region by way of the open clutch. The converter fluid then flows from that region as a converter return flow CDC by way of the line (CDC/LUC) and from the control valve 500 by way of the line (COOLER).

In the second, upshift position, in which the converter clutch LUCL is closed, line pressure LINE flows to the lockup clutch by way of the line (CDC/LUC) into the converter torus region, while the downstream side of the lockup clutch piston is discharged as a converter return flow EX by way of the line (CC/EC) to the oil sump. The converter inflow pressure CC from the line (CC/COOLER) flows by way of the line (COOLER) directly to the cooler.

The control valve 500, in particular its spring 502, is designed in such a way that it can respond to changes in the level of the line pressure. When traveling in the third and fourth gears and with the converter lockup clutch engaged, the converter lockup clutch is disengaged as the accelerator pedal is released since the throttle pressure signal then falls rapidly and the line pressure thereby is reduced to a value that allows the spring 502 to shift the valve member 504 down. In this way the driving engine is driven at high speed in the so-called coasting drive mode of the motor vehicle.

In normal operation, the control valve 500 is controlled as a function of velocity by means of a lockup clutch shift valve 520 which comprises a valve member 522 having four control lands 532, 524, 525 and 526. Valve 520 is held in the position shown in FIG. 3C by means of spring 527. The lower end of valve member 522 is acted upon by the centrifugal governor pressure GOV. The control land 525 is acted upon by a control pressure TDC/KD/2/1/R-I and its upper end is acted upon by modulator valve 530, which comprises a valve member 531 with a control land 532 and a spring (533). Land 532 is acted upon by the throttle pressure TV/TVB in a downward direction and by control pressures KD/2/1/R-I and MOD/KD/2/1/R-I in an upward direction.

Figure 3C:
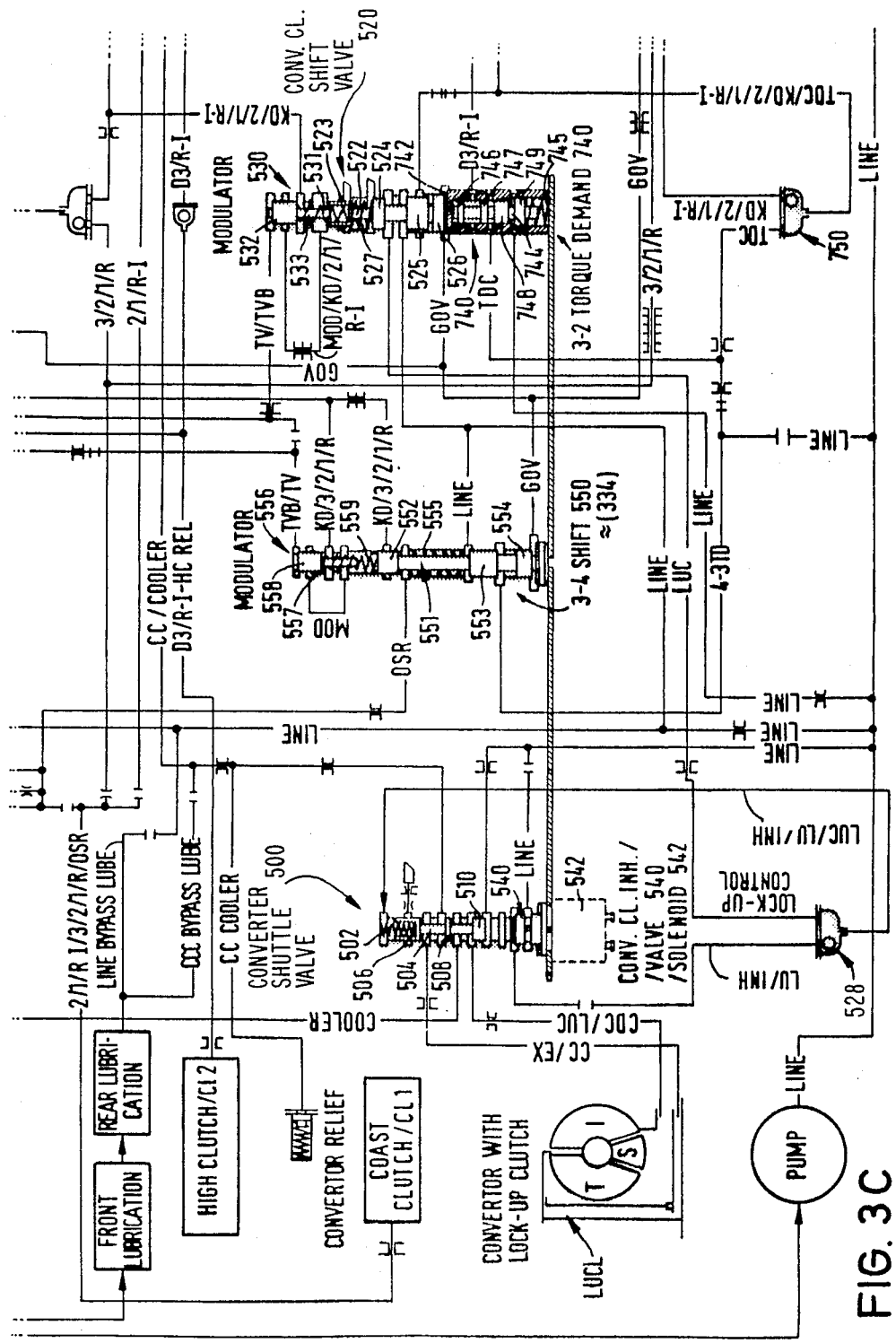

If the valve member 522 of the torque-converter lockup clutch shift valve 520 is in the position illustrated in FIG. 3C, line pressure LINE is fed to the lockup clutch as pressure LUC by way of the space between the control lands 524 and 525 to the torque-converter, lockup clutch control valve 500, and here it reinforces the force of the spring 502 which holds the valve member 504 down against the line pressure LINE acting upon the lower end. In this way valve 500 keeps the torque-converter lockup clutch disengaged. As soon as the vehicle speed increases to that the centrifugal governor pressure GOV increases and the control pressures TDC/KD/2/1/R-I counteracting the latter are overcome, the valve member 522 is upshifted and the line pressure LINE is shut off. The upper end of the torque-converter, lockup clutch control valve 500 is acted upon by spring 502 which urges the valve member 504 downward. If high line pressure LINE in normal operation is sufficiently high, this causes an upshift of the valve member 504, as a result of which the torque-converter, bridging clutch is engaged. As already described, only if the accelerator pedal is released is the line pressure reduced sufficiently to avoid an upshift of the valve member 504 against the force of the spring 502.

The lockup clutch pressure LUC of the shift valve 520 acts upon the control valve 500 by way of a ball shuttle valve 528. A lockup clutch inhibitor pressure LU/INH is produced by a lockup clutch inhibitor valve 540 actuated by a solenoid 542, controlled electrically or by a microprocessor, can also optionally be fed to the same place to supplement the force of spring 502. In this way, depending upon further operating conditions, engagement of the torque-converter bridging clutch can either be prevented or the engaged clutch can be disengaged.

A 3-2 torque drive shift valve 740 is disposed in the valve bore of the lockup clutch shift valve 520. The 3-2 torque drive shift valve 740 comprises a valve sleeve 742, which is disposed in the valve bore in which a valve member 744 is disposed. Valve spring 745 urges valve member 744 upward. The valve member 744 comprises four control lands 746, 747, 748 and 749.

In the case of a torque requirement below the kickdown range, the 3-2 torque drive shift valve 740 permits a 3-2 shift to obtain the necessary acceleration for overtaking.

The 3-4 shift valve 550 required for a 3-4 upshift comprises a valve member 551 with three control lands 552, 553 and 554 and a valve spring 555. Valve 550 differs from a conventional shift valve of this type (334) inasmuch as an upshift into the fourth gear can be prevented by way of an hydraulic forced blocking of the shift valve when the manual selection valve is in position D. The effective control pressure acts by way of the line (KD/3/2/2/R). A modulator valve 556 acting upon the 3-4 shift valve 550 causes an automatic upshift into the fourth gear depending upon the effective throttle pressure TV/TVB, the force of the two springs and the centrifugal governor pressure GOV acting upon the lower end of the 3-4 shift valve 550, provided the manual selection valve is in position DE.

In order to prevent an undesirable engagement of the reverse gear in the event of erroneous actuation of the manual selection valve at high velocities of travel, a reverse gear inhibitor valve 580 is provided, as shown in FIG. 3D. Above a predetermined speed of, for example, 16 km/h, valve 580 prevents a release or actuation of the shifting servos for the reverse gear. That is, the servos for the second clutch CL2, the first clutch CL1 and the third brake B3 cannot be actuated when the shifting position "R" of the manual selection valve is in effect. For this purpose the reverse gear inhibitor valve 580 has a valve member 582 which is held in its locking position against the pressure of a spring 584 by the centrifugal governor pressure GOV acting upon its right end at high vehicle speeds. The inhibiting action continues until a defined velocity is reached and the engagement of the gear can be completed.

Since the engagement of the third brake B3 is also necessary for the shifting position "1" on the manual selection valve (300), when the shifting position "1" is selected by the manual selection valve (300) the reverse gear inhibitor valve 580 is automatically made inoperative.

In the same way, when the manual selection valve (300) is engaged in the shifting position "2" or "1" at an excessive vehicle speed, the engagement of the selected gear is prevented until the velocity of travel has fallen below a predetermined value that allows the desired shifting to be carrier out.

In the embodiment of FIG. 3D a 2-3 shift valve 450 essentially corresponding to a conventional 2-3 shift valve (446) comprises a valve member 451 with five control lands 452, 453, 454, 455, and 456. The pressure 2/1/R-I acts upon the control land 455 and the pressure MOD/KD/2/1/R-I acts upon the control land 456, while on the other hand the centrifugal governor pressure (GOV) acts upon the control land 452 so that, when the manual selection valve is moved to the shifting position "2" at an excessive velocity of travel, the acutation of the corresponding shifting elements may be prevented until the vehicle speed has fallen below a predetermined value, for example 118 km/h, and the second gear can be engaged.

A D2 shift valve (429) of known design cooperates with 1-2 shift valve (428) also of known design. The D2 shift valve (429) comprises a valve member (430) with six control lands (431 to 436), the pressure MOD/KD/2/1/R-I acting upon the control land (431), the pressure 1/R-I acting upon the control land (432) and the pressure D/3/2/1 acting upon the control land (434), while on the other hand the centrifugal governor pressure GOV acts upon the control land (431) so that, when the manual selection valve is moved to the shifting position "1" at an excessive velocity of travel, the servos for engaging the second gear are first actuated and only after the vehicle speed has fallen below a predetermined value, for example 60 km/h, does the desired shifting into the first gear take place.

For the setting of the very important 3-2 load coasting downshift a new valve concept has been developed which, as against the previous four drive ranges, has been extended to eight drive ranges for better calibration, the concept of the throttling of the disengagement procedure of the second clutch CL2 and the application procedure of the second brake B2 having been retained in principle.

In the known valve arrangement according to the control system of U.S. Pat. No. 3,706,240, a normal 2-3 shift valve (446) cooperates with two 3-2 cushion control valves, a 3-2 coasting downshift control valve (276) and a 3-2 torque demand downshift control valve (278).

This known valve arrangement has made possible 3-2 shifts set in accordance with the shifting logic illustrated in FIG. 5 in four drive ranges, namely in a manual shifting initiated by way of the manual selection valve in the coast drive mode, in an automatic shifting in the coast drive mode, in a shifting caused by a kick-down valve and a shifting produced by a moderate torque demand.

In contrast, in the case of the valve arrangement of this invention, a normal 2-3 shift valve (446) cooperates with three further 3-2 cushion control valves in addition to a 3-2 coasting-drive control valve 600 (FIG. 3B), which corresponds approximately to the know valve (276), and a 3-2 kick-down shift valve 640 (FIG. 3A), which corresponds approximately to the known valve (278). These additional 3-2 cushion control valves are a 3-2 torque demand downshift control valve 620, a 3-2 kick-down control valve for the second gear servo B2 660 and a 3-2 kick-down control valve for the third gear clutch CL2 680 (FIG. 3A).

By actuating the valve arrangement according to the invention, which is carried out in accordance with the shifting logic in FIG. 6, fixed 3-2 downshift points are made possible for eight different drive ranges.

A 3-2 downshift is obtained as the reverse gear and direct gear clutch CL2 is released and the brake band for the second gear B2 is applied.

The control of the downshift is based essentially on the fact that the displaced oil can flow away at different rates from the disengaging clutch CL2 and from the release side of the engaging piston of the servo of the brake B2 by way of different valves and through throttle openings of different sizes. The 3-2 downshift may be divided into three general ranges:

DE-3-2 Downshift in Forward Drive

In forward drive the 3-2 sliding-drive control valve 600 remains in the position illustrated in FIG. 3. In this way the discharge pressure of the second gear servo ISR ACC can flow away by way of the duct (ISR ACC EX) and by way of the throttle orifice LTV. The discharge pressure of the clutch CL2, HC REL, can flow away by way of the duct (HD REL EX) without being throttled.

DE-3-2 Downshift in Torque Demand Mode

Under torque demand the throttle pressure TV acting upon the lower end of the 3-2 sliding-drive control valve 600 is so high that it shifts the valve member upwards against the force of the spring. In this way, at low speeds, the discharge pressure of the second gear servo ISR ACC and the discharge pressure of the clutch CL2 HD REL flow together and are led off either by way of the throttle orifice TD1 or by way of the throttle point TD2 depending upon the velocity of travel applied and the governor pressure GOV applied to the lower end of the 3-2 torque-drive control valve 620. At higher velocities of travel the governor pressure GOV acting upon the lower end of the 3-2 kick-down shift valve 640 (FIG. 3A) shifts this valve, as a result of which the discharge pressure of the clutch CL2 HC REL and the discharge pressure of the second gear servo ISR ACC are separated again. The discharge pressure of the clutch CL2 HC REL is then discharged by way of the 3-2 CL2 kick-down control valve 680 and, depending upon the vehicle speed, by way of throttle orifices HC KD1 or HD KD2, while the discharge pressure of the second gear servo ISR ACC can flow away by way of throttle orifices ISR KD1 or ISR KD2.

DE-3-2 Downshift (Kick-Down)

In this case, at higher speeds the 3-2 coast drive control valve 600 (FIG. 3B), the 3-2 torque-drive control valve 620 (FIG. 3B) and the 3-2 kick-down shift valve 640 (FIG. 3A) are shifted upwards.

The 3-2 CL2 kick-down control valve 680 (FIG. 3A) and the 3-2 B2 kick-down control valve 660 (FIG. 3A) likewise operate in response to changes in vehicle speed and in this way they distribute the discharge pressure HC REL of the clutch CL2 by way of throttle orifices HC KD1 and HC KD2. The discharge pressure ISR ACC of the second gear servo is distributed by way of throttle orifices ISR KD1 and ISR KD2.

The two 3-2 kick-down control valves, the one for the second gear servo B2 660 and the one for the third gear clutch CL2 680, assure that in the case of a 3-2 downshift caused by a kick-down, a controlled release of the second clutch CL2 and a controlled application of the second brake B2 is effected depending upon the vehicle speed at that instant. The controlled release of clutch CL2 and application of brake B2 is effected by the different throttle orifices ISR KD1, ISR KD2, HC KD1 and HC KD2. These throttle orifices determine the rate of discharge of pressure fluid from the second clutch CL2 or from the release side of the second gear servo B2. They, therefore, determine the rate of the application of the brake band of the second brake B2 on a 3-2 downshift.

The 3-2 torque drive shift valve 740 (FIG. 3C) assumes an extension of the drive range, within which there is available downshift from the third gear to the second gear upon a moderate depression of the accelerator pedal and the torque demand expressed by the latter. Depending upon the level of the centrifugal governor pressure GOV, which acts upon the lower end of the 3-2 torque drive control valve 620 and which is dependent upon the vehicle speed, the 3-2 torque drive control valve 620 activates different throttle orifices TD1 and TD2, respectively. This assures a controlled release of the second clutch CL2 for third gear and a controlled application of the brake band for the second brake B2.

Figure 4:
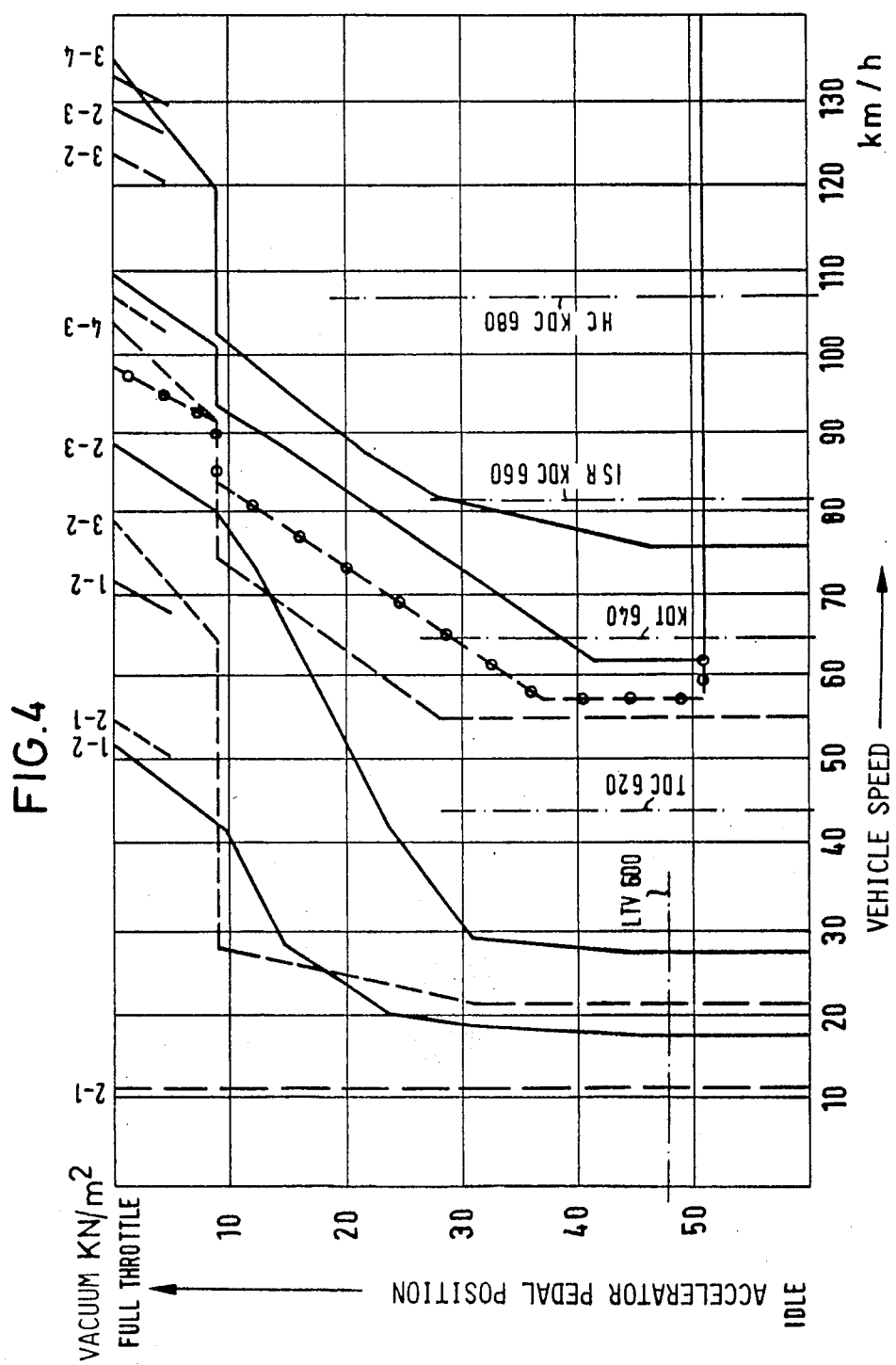
FIG. 4 shows the shifting characteristic for the hydraulic control valve system in FIGS. 3a through 3d.

The shifting characteristic of the hydraulic control valve system according to the invention can be seen in the shifting diagram of FIG. 4 in which the vehicle speed is indicated on the abscissa and the accelerator pedal position is indicated on the ordinate, and in which the shifts are indicated in solid lines and the corresponding downshifts are indicated in broken lines.

Consider, for example, an accelerator pedal position in which a pressure of 30 KN/m$^2$ is present. By moving the eye along the horizontal line at 30 towards the right, one can establish that upshifts from the first to the second gear take place at a vehicle speed slightly below 20 km/h. The next upshift from the second to the third gear takes place at a speed of slightly over 30 km/h, and after that the converter lockup clutch is engaged at somewhat over 70 km/h. Upshifting into the fourth gear is effected only over 80 km/h.

If we move on the same horizontal line back toward the left, one can establish that, as shown by the broken line marked with circles, disengagement of the converter lockup clutch first occurs at approximately 64 km/h. After this the downshift from the fourth gear to the third gear takes place at approximately 55 km/h. The subsequent downshift from the third gear to the second gear takes place at approximately 22 km/h and the subsequent downshift from the second gear to the first gear always takes place at approximately 12 km/h.

It may easily be seen from a comparison of the various horizontal lines and the upshift or downshift lines that in the case of a high torque demand—i.e., when the accelerator pedal is depressed to a wide throttle setting and the vacuum decreases—the corresponding upshifts are moved substantially so that they are delayed until high vehicle speeds occur.

The shift lines shown in short, broken and solid lines on the upper portion of the diagram relate to the upshifts or downshifts that are initiated when the so-called kick-down valve is actuated by complete depression of the accelerator pedal.

The speed ranges in which the different shift cushioning valves are effective are indicated by ranges designated LTVD 600, TCD 620, KDT 640, ISR KDC and HC KDC 680 and by dash-dot lines on the ordinate or the abscissa, respectively.

The 3-2 downshift, as may be seen from the diagram, can be carried out in the range between approximately 45 and 65 km/h by a torque demand that does not necessarily correspond to the full acceleration or kick-down position of the accelerator pedal. In the same way, a 4-3 downshift is also possible in the case of a torque demand below the full acceleration position kick-down requirement.

The hydraulic control valve system, in conjunction with the improvements to the known valve functions, permits a more flexible shifting characteristic in the case of a torque demand by the driver on the one hand and a greater smoothness as a result of the downshift controls.

Figure 7A:
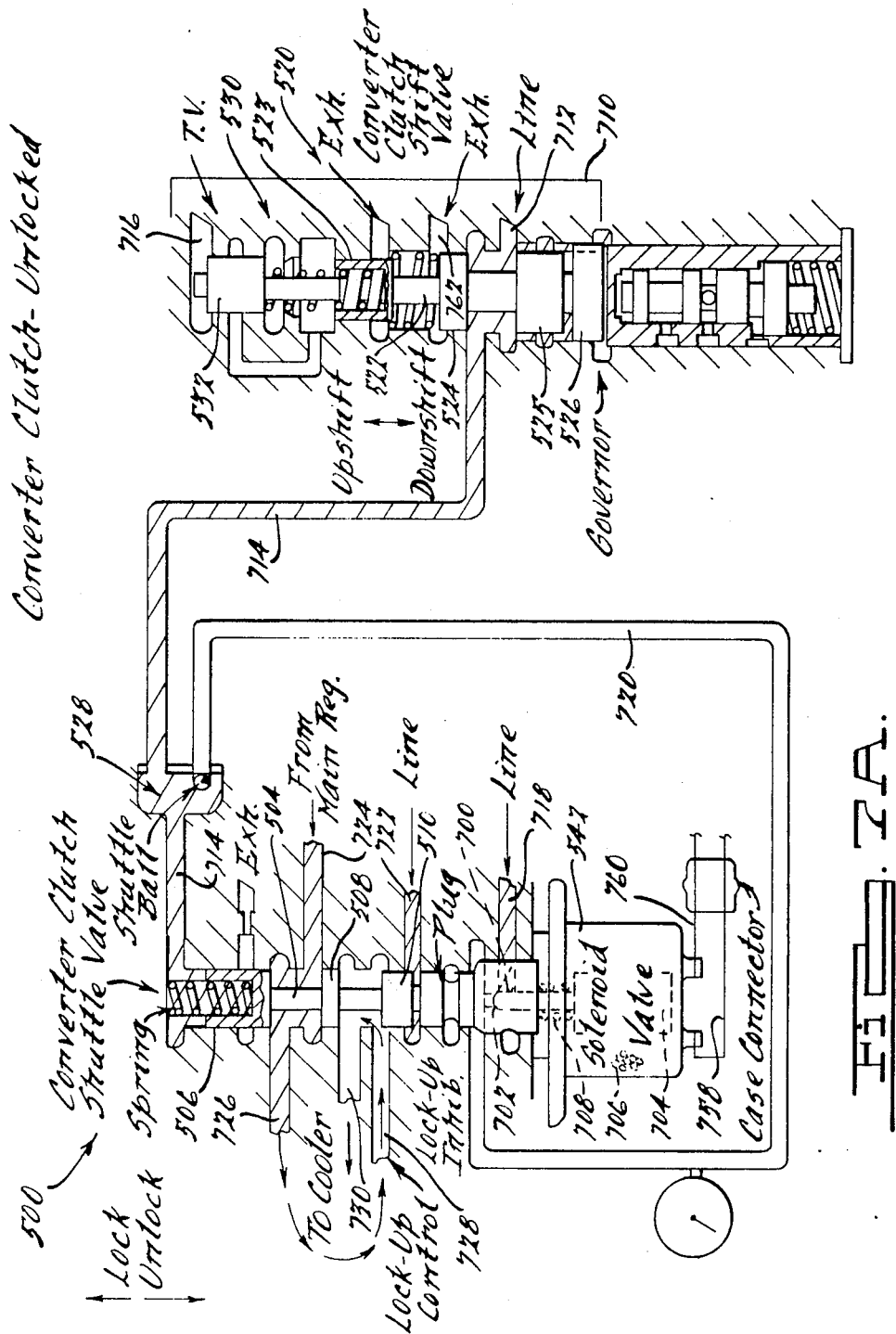
FIG. 7a shows a portion of the valve system of FIGS. 3a through 3d with special emphasis on the converter clutch shuttle valve and the converter clutch shift valve. The valves in this view are shown in the positions corresponding to a converter clutch unlocked condition.

Referring next to FIG. 7a, we have illustrated the converter clutch shuttle valve, also known as the converter clutch control valve, and the converter clutch shift valve, also known as a lockup shift valve. In FIG. 7a, these valves, shown respectively at 500 and 520, are in the positions corresponding to a converter clutch unlock mode. At the base of the shuttle valve 500 is a solenoid valve 542 which comprises a valve stem 700 that is adapted to register with a control orifice 702. Valve spring 708, urges the valve stem 700 out of registry with respect to the orifice 702.

Governor pressure is distributed through passage 710 to the lower end of land 526 of the converter clutch shift valve 530. Line pressure is distributed to port 712 of the converter clutch shift valve 530 intermediate lands 524 and 525. When the governor clutch valve 530 is in the position shown in FIG. 7a, line pressure is distributed through passage 714 and through the shuttle ball valve 528 to the upper end of land 506 of the converter clutch shuttle valve 500. The force of the governor pressure on the land 526 is opposed by throttle valve pressure distributed to the upper end of land 532 through passage 716.

When the converter clutch shuttle valve assumes the position shown in FIG. 7a, the converter clutch is unlocked. At that time, the solenoid valve 542 blocks communication between line pressure passage 718 with the valve chamber below land 510 of the converter clutch shuttle valve. The downstream side of the orifice 702 communicates through passage 720 with passage 714 through shuttle ball valve 528. Line pressure is distributed also to the lower end of land 510 through passage 722. Converter clutch and cooler pressure is distributed to valve 500 through passage 724.

When the valve 500 assumes the position shown in FIG. 7a, communication is established between passage 724 and passage 726 which extends to the space between the lockup clutch piston plate and the impeller housing so that the lockup clutch piston plate is forced to an unlocked position. Fluid is returned from the torus circuit of the converter to the valve 500 through lockup control passage 728. When the valve 500 is positioned as shown in FIG. 7a, passage 728 communicates with a transmission cooler through passage 730.

Solenoid valve 542 is under the control of microprocessor 732, which includes a central processing unit 734, output driver circuits 736 and input signal conditioning circuits 738. These storage registers are located in memory 740. The input signal conditioning circuits receive an electrical voltage signal from a brake switch 742 through line 744. When the brakes are applied, switch 742 closes thereby sending a signal to the microprocessor that indicates that the brakes are applied. An engine torque coolant temperature signal is developed by sensor 746 and distributed through line 748 to the input signal conditioning circuits.

A carburetor throttle position signal generator 750 distributes an electrical signal through line 752 to the microprocessor so that the microprocessor is capable of responding to a closed throttle operating condition or a wide open throttle operating condition. An altitude pressure sensor 754 distributes an electrical signal through line 756 to the microprocessor.

The output driver circuit of the microprocessor 732 is connected to the power leads 758 and 760 of the solenoid valve 542. A microprocessor responds to the input signals to open or close switch 736 as will be explained subsequently. Thus, the shuttle valve is either opened or closed, depending upon the operating condition.

FIG. 8 is a chart that shows four different operating conditions for the solenoid valve. In the first condition, the solenoid is off and the converter clutch shuttle valve is off. In this instance, the solenoid valve permits line pressure to pass from passage 718 to the top of land 506, thereby forcing the converter clutch shuttle valve to the unlocked position. The second condition shown in FIG. 8 is illustrated in FIG. 7a where the solenoid is on and the converter clutch valve is off. This produces an unlocked state for the converter clutch. In this instance, line pressure passes from passage 712 through passage 714 to the top of land 506 as current is flowing through the solenoid valve 542, thereby blocking orifice 702.

Figure 7B:
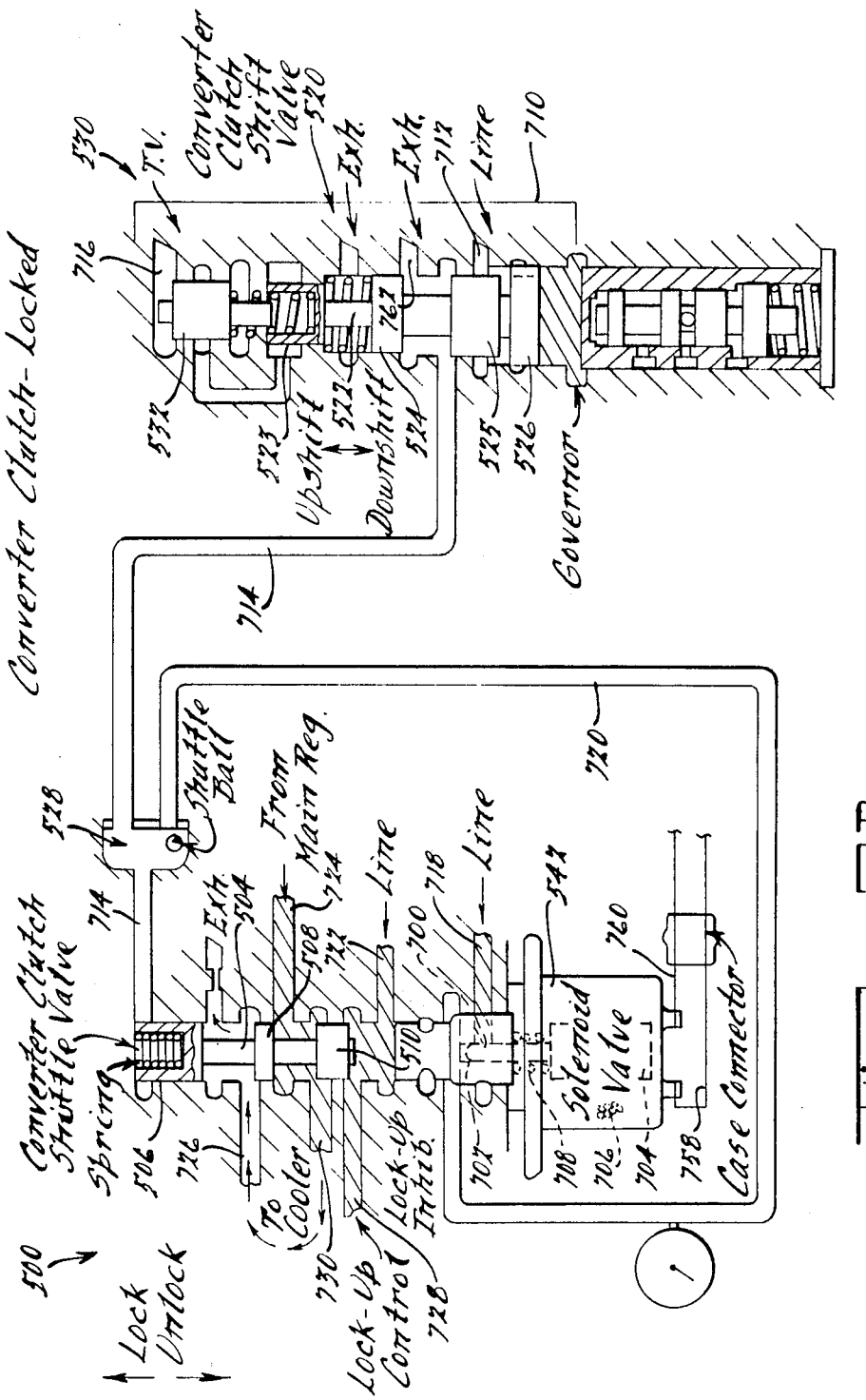
FIG. 7b is a view similar to FIG. 7a but the valves have been shifted to a position corresponding to a converter clutch locked position. The vehicle speed is above a calibrated minimum value.
Figure 7C:
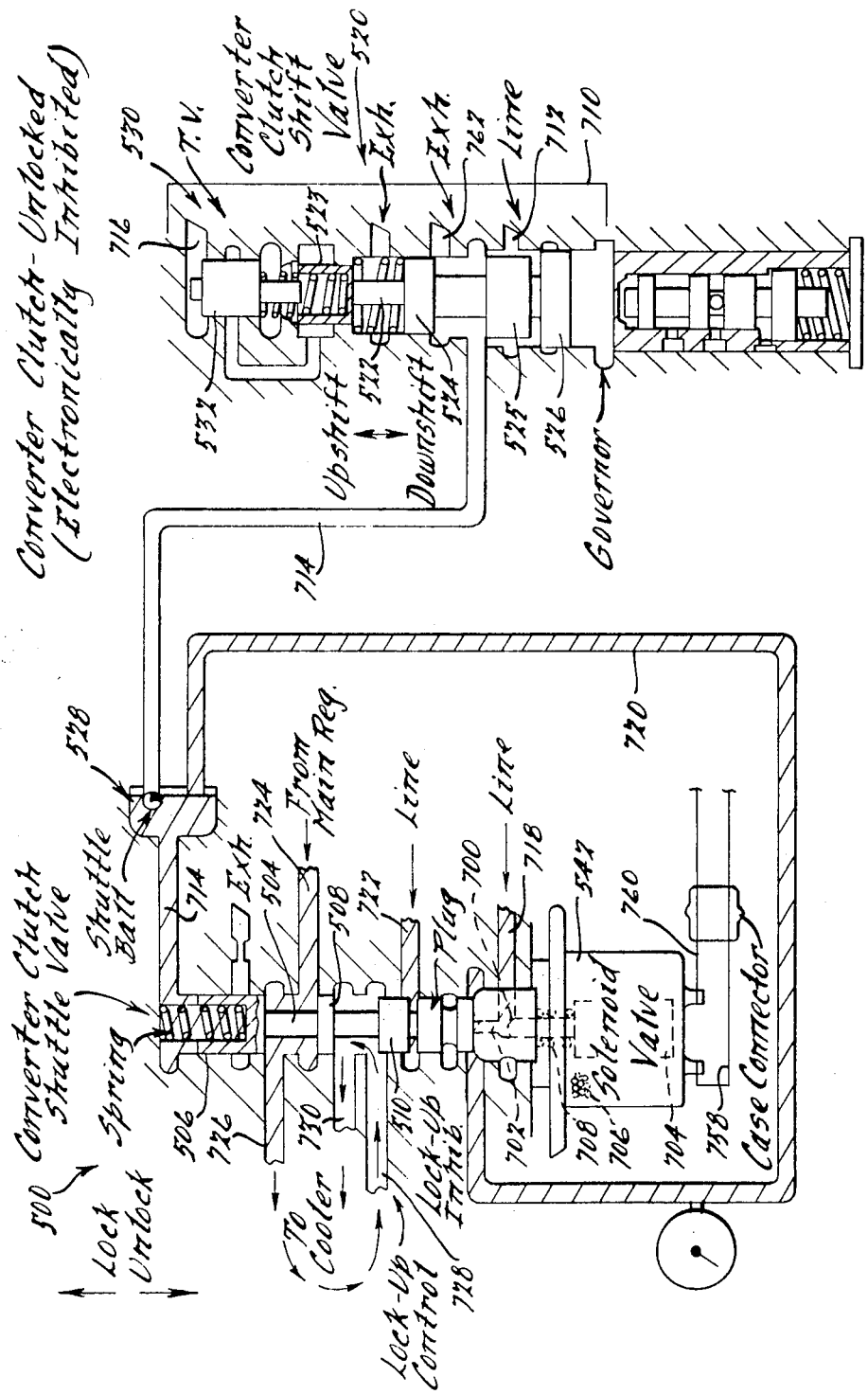
FIG. 7c is a view similar to FIG. 7a wherein the converter clutch is shown in the unlocked position and wherein the converter clutch solenoid valve is deenergized where the vehicle speed is above the predetermined position illustrated with reference to FIG. 7b.

The third condition listed in FIG. 8 is illustrated in FIG. 7c where the solenoid is off and the converter clutch valve is on. This produces an unlocked condition of the clutch because the orifice 702 now is open, thereby admitting line pressure from passage 718 to the top of land 506 through the shuttle ball valve 528. The governor pressure acting on the lower end of land 526 is sufficient to move the converter clutch shift valve upwardly; but this has no effect since the top of the land 506 is pressurized with line pressure regardless of the position of the converter clutch shift valve.

In the fourth condition listed in FIG. 8, the converter is in a locked state where the solenoid is energized and the converter clutch valve is on. This is illustrated in FIG. 7b. Current is flowing through the solenoid valve, thus closing the orifice 702, but the governor pressure is sufficient to move the converter clutch shift valve upwardly thereby exhausting passage 714 through exhaust port 762.

FIG. 8a shows the various operating zones at low vehicle speeds for any given manifold vacuum. The converter clutch shift valve is in the position shown in FIG. 7a. This is represented by the lower region labelled "A" in the diagram of FIG. 8a. For example, when the manifold vacuum is 20 psi and the vehicle speed is less than 10 mph, the converter clutch shift valve moves downwardly and the solenoid valve blocks orifice 702. The converter clutch is thus unlocked. When the vehicle speed increases for any given manifold vacuum, the operating point enters region "B" where the electronic control or module takes over the control function. At this point, the converter clutch shift valve moves upwardly, as shown in FIG. 7b, thereby exhausting line 714 through exhaust port 762. But since the controller in response to the sensor signals causes the switch 736 to be opened, the pressure is distributed from line 720 and through the orifice 702 to the top side of the converter clutch shuttle valve, as shown in FIG. 7c, thereby maintaining the converter clutch in an unlocked condition. Thus, the solenoid valve overrules the operation of the converter clutch shift valve.

When line C in FIG. 8a is reached upon an increasing vehicle speed for any given manifold vacuum, the electronic control module responds to the input sensors to distribute current to the solenoid, thereby blocking orifice 702. This allows valve element 504 to shift upwardly, and communication then is established between line 722 and line 728 leading to the converter clutch. As long as the relationship between vehicle speed and engine vacuum is confined to region "D" in FIG. 8a, the clutch will remain locked.

As the vehicle speed decreases for any given manifold vacuum, the clutch will remain locked until the relationship between vehicle speed and vacuum reaches a point on line E, which is the point at which the control module distributes current once again to the solenoid, thereby blocking distribution of line pressure to the top side of the converter clutch shuttle valve. The downshift point at which the clutch becomes unlocked for any given manifold vacuum is less than the upshift vehicle speed point at which the converter clutch becomes locked. This is a hysterisis effect that eliminates hunting between a locked condition and a unlocked condition when the vehicle speed and vacuum are such that the operating point would fall close to the lockup shift point.

In the event that the electronic control module or the solenoid valve should not function, the lockup clutch would be under the control of the converter clutch shift valve, and the clutch would become locked whenever the governor pressure is sufficient to move the shift valve in the upward position, as shown in FIG. 7b. It would effect a clutch unlocked condition when the governor pressure decreases relative to the throttle valve pressure acting at the opposite end of the valve as the valve moves to the position shown in FIG. 7a. Thus, the control is a hybrid control in which the clutch can be controlled hydraulically or electronically, depending upon whether the controller and the solenoid valve are operating.

The control strategy for the lockup clutch, when the electronic control module and the solenoid valve are operative, includes a time delay between the presence of a sensor signal mandating a quick speed change and the actual execution of that change. Therefore, the electronic control module includes a timer which forces a delay in the lockup clutch schedules until the timer has counted down to zero. If the timer has not counted down to zero, the strategy requires a clutch unlock condition to be maintained following operation in a lockup condition in a third or fourth gear ratio. The clutch becomes unlocked, for example, if the carburetor throttle position sensor 750 indicates a closed throttle or a near wide open throttle position. The same is true if the brake apply signal is distributed to the microprocessor by the brake switch 742. The sensor 750 also develops a high tip-in rate and a high tip-out rate for the throttle. That is, if the throttle is moved to an advanced position and then relaxed during a calibrated time period of 5 or 6 seconds or less, the timer will not have reached a zero value, and the microprocessor will not respond by distributing a signal that opens or closes the switch 736.

The microprocessor senses whether the transmission is in the third ratio or the fourth ratio. It does this by comparing the vehicle speed signal with the engine rpm signal. Thus, the converter clutch apply and release schedules are altered, depending upon whether the transmission is in the third ratio or the fourth ratio. The lock and unlock schedules or tables for the converter clutch are modified, therefore, depending upon transmission ratio. There is a clutch lock table for third and fourth gear, an unlock table for third and fourth gear, an upshift table for third gear, and a downshift table for fourth gear.

The altitude sensor corrects the vacuum calculation for the lock and unlock tables and for the shift tables.

Having described preferred embodiments of our invention, what we claim and desire to secure by U.S. Letters Patent is:

1. A control system for an automatic transmission in an engine powered vehicle comprising multiple ratio gearing:
   a pressure source;
   a clutch and brake means for effecting ratio changes including two top ratios and at least one lower, underdrive ratio;
   a hydrokinetic torque converter having a turbine connected to torque input portion of said gearing and an impeller connected to said engine;
   a pressure operated lockup clutch means in said converter for directly connecting said turbine and said impeller;
   a control circuit including pressure operated means for sequentially actuating said clutch and brake means and shift valve means for controlling distribution of pressure from said source pressure to said pressure operated means
   a converter clutch shift valve and a converter clutch shuttle valve in portions of said circuit connecting said pressure source to said lockup clutch means;
   a source of a torque signal and a source of a speed signal connected to said converter clutch shift valve whereby the latter is shifted between a lockup clutch engaging position and a lockup clutch disengaging position depending upon the relative values of speed and torque;
   said shuttle valve establishing and disestablishing communication between said lockup clutch and said pressure source as it is shifted between a lockup position and an unlock position in response to movement of said converter clutch shift valve, the latter being hydraulically linked to the former;
   a solenoid valve means connected hydraulically to said converter clutch shuttle valve;

a microprocessor control unit for energizing and deenergizing said solenoid valve whereby the latter distributes actuating pressure selectively to said converter clutch shuttle valve, the influence of said converter clutch shift valve on said converter clutch shuttle valve thereby being overruled at speeds greater than a minimum calibrated valve; and engine torque demand sensing means, engine speed sensing means and vehicle speed sensing means communicating with input signal conditioning portions of said microprocessor control unit.

2. The combination as set forth in claim 1 wherein said engine has a throttle and said torque demand sensing means comprises an electrical motion to voltage transducer that is adapted to detect a closed engine throttle and a near wide open engine throttle and to detect frequent advancement and retraction of the engine throttle, said microprocessor having a signal conditioning timer that delays responses to rapid throttle position changes until a calibrated delay time occurs between a reset triggered by throttle movement and a countdown to zero.

3. The combination as set forth in claim 2 wherein said control system includes an engine coolant sensor, the input signal conditional portion of said microprocessor being connected to a said coolant sensor whereby said microprocessor responds by forcing a clutch unlock condition when the engine is cold or overheated.

4. The combination as set forth in claim 2 wherein said control system comprises a vehicle brake apply sensor, the input conditioning portion of said microprocessor being connected to brake apply sensor, said signal conditioning timer being reset by said brake apply sensor upon brake application, thereby preventing subsequent response to brake application until said timer counts down to zero.

* * * * *